Oct. 30, 1956     A. W. FEIERTAG     2,768,686
CUTTER BLOCK FOR GROOVING MACHINE

Original Filed Dec. 21, 1953     3 Sheets-Sheet 1

INVENTOR.
ARTHUR W. FEIERTAG
BY
Mellin and Hanscom
ATTORNEYS

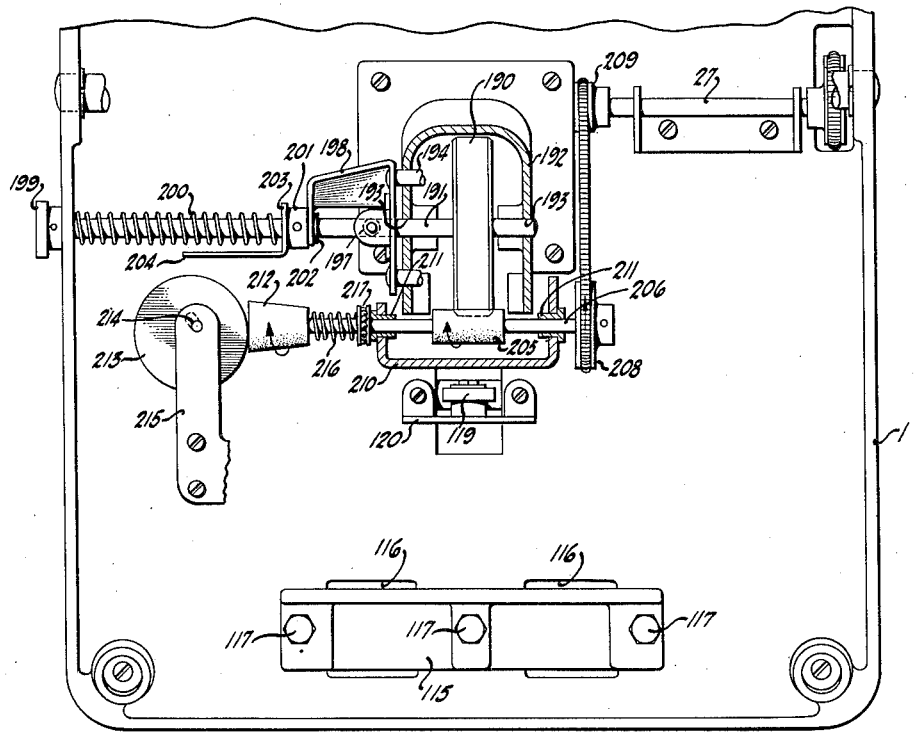
FIG-4
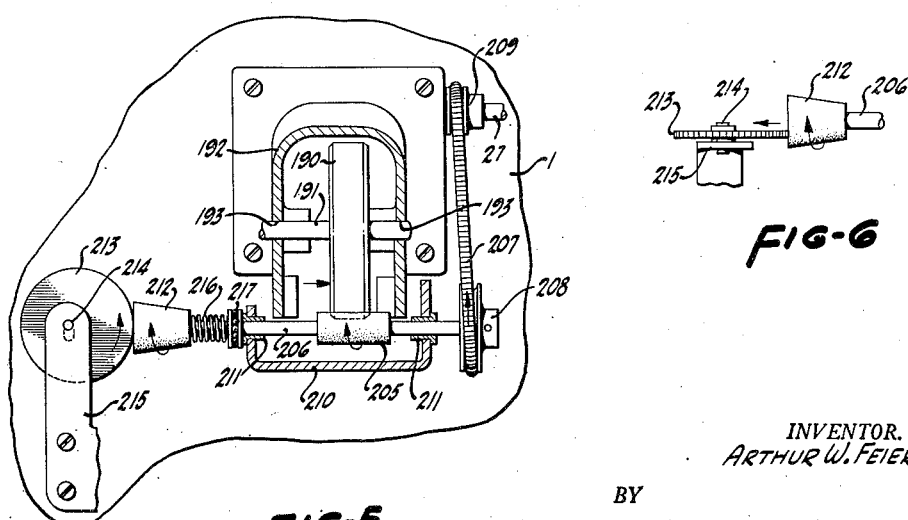
FIG-5
FIG-6
INVENTOR.
ARTHUR W. FEIERTAG
BY
Mellin and Hanscom
ATTORNEYS Oct. 30, 1956

A. W. FEIERTAG 2,768,686

CUTTER BLOCK FOR GROOVING MACHINE

Original Filed Dec. 21, 1953

INVENTOR.
ARTHUR W. FEIERTAG
BY
Mellin and Hanscom
ATTORNEYS

United States Patent Office 2,768,686
Patented Oct. 30, 1956

2,768,686
CUTTER BLOCK FOR GROOVING MACHINE

Arthur W. Feiertag, Athens, Ohio, assignor, by mesne assignments, to Royal McBee Corporation, a corporation of New York Original application December 21, 1953, Serial No. 339,405. Divided and this application December 21, 1953, Serial No. 399,327

11 Claims. (Cl. 164—58)

This invention relates to machines for cutting grooves or notches into the edge portion of cards for identifying the cards with respect to various classifications, and more particularly to a power operated machine for grooving edge portions of a stack of cards at one time.

This application is a divisional part of my copending application, Serial No. 399,405, filed December 21, 1953.

An important object of the invention is to provide a card grooving machine provided with a cutting block, which is moved to present a different area to the cutter at each operation, to distribute and thereby minimize wear; and to provide mounting means permitting the block to be readily removed for refinishing or replacement when required.

The invention has other objects and features of advantage, some of which with the foregoing will be explained in the following description of that form of the invention illustrated in the drawings. It is to be understood that the invention is not limited to the embodiment shown in the drawings as it may be embodied in other forms and parts may be variously modified within the definition of the claims.

In the drawings:

Fig. 4 is a partial bottom view of the machine, partially shown in section.

Fig. 5 is a fragmental bottom view, partly in section, illustrating the structure and operation of the cutter block actuating mechanism.

Fig. 6 is a fragmental detail showing the mechanism for shifting the cutter block axially.

Figure 1:
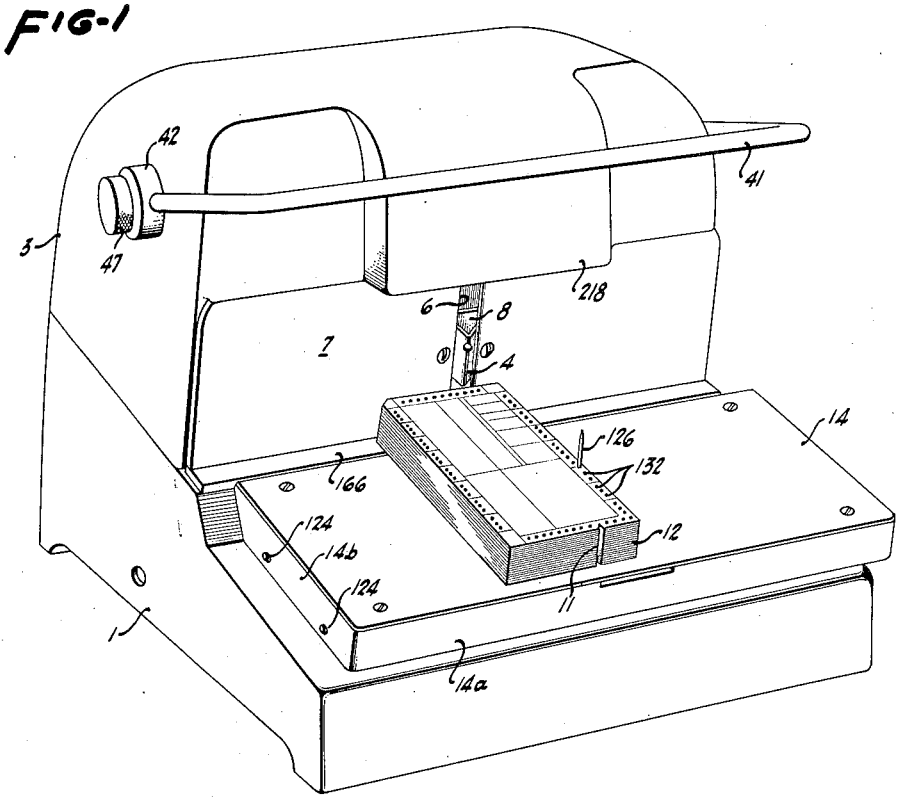
Fig. 1 is a perspective view of a card grooving machine embodying the invention.

An important feature of the invention is the provision of an improved cutter block, removably mounted in association with the cutter, and actuated with both rotative and axial movement, to present a different area to the cutter after each cycle of operation.

In terms of greater detail, the electric grooving machine of my invention comprises a base frame housing 1 on which is secured an upstanding mounting bracket (not shown) for supporting mechanism normally enclosed by a cover 3 removably secured to the base housing 1. A cutter 4, is mounted for reciprocating movement upon the mounting bracket. The cutter extends outwardly from the housing cover 3 through an opening 6 formed in a shield plate 7 mounted across the front of the cover housing 3. The cutter 4 is replaceably secured to a side block 8, slidably movable along guide ways secured to the mounting bracket. The cutter 4 is provided with a V-shaped cutting edge 5 of a character suitable for cutting grooves 11 in the edges of a stack of record cards 12 supported upon a carriage 14 movable to present the cards to the cutter for grooving at predetermined points.

A suitable power drive means (not shown) is provided to operate the cutter 4 in its reciprocatory movement, the power drive means being controlled by a suitable control shaft (not shown) which in turn is operated by hand lever 41. The hand lever 41 is releasably secured to the control shaft by means of hubs 42 held in place by knobs 47 by which the hand lever 41 may be removed from the control shaft.

The carriage 14, by which the cards 12 are supported for movement into position for grooving by the cutting element 4, comprises a body of generally rectangular shape substantially conforming in size and shape to the lower forward portion of the base housing 1. The carriage body is provided with a smooth upper surface substantially parallel to the top of main housing 1, and is provided with downwardly extending flanges 14a and 14b along the front and sides respectively substantially aligned with the front and side of the front part of the base housing when the carriage is in its central position. Front and back carriage supporting rods 112 and 113 are mounted to extend across the under side of the carriage body between the end flanges 14b, and in spaced parallel relation to the front flange 14a. The front mounting shaft 112 is slidably mounted for movement in an axial direction through lugs 114 formed upon the ends of a mounting member 115 secured to the base housing 1 adjacent the front edge thereof. As illustrated, the lugs 114 extend upwardly through openings 116 in the housing 1, the body of the mounting member 115 being secured within the housing by machine screws 117 or other suitable securing means.

The rod 113 engages a roller 119 journaled upon a bracket 120 secured to the under side of the base housing 1. The roller 119 is positioned below the rod 113, and rotates upon an axis disposed at right angles to the axis of the rod 113. The roller extends to a level slightly above the upper surface of the base housing 1, through an opening 121 formed in said housing. A finger 122 formed on the bracket 120 extends upwardly through the opening 121 and overhangs the rod 113 to hold the carriage in its operative position and prevent pivotal movement about the shaft or rod 112. A pair of rubber bumpers 123 are mounted upon the top of the housing 1 adjacent the carriage rod 113 and at opposite side of the roller 119 and the finger 122. The bumpers 123 provide stops against which the side walls 14b of the carriage may be moved, and which limit the transverse movement of the carriage relative to the base housing 1 and the cutter 4. The rods 112 and 113 are secured to the carriage body by means of screws 124 threaded axially into the rods through openings in the side walls of the carriage. The carriage may be removed from the base frame by taking out the screws 124 by which the rod 112 is held in place, thereby permitting the carriage to be moved to carry the rod 113 from under the finger 122.

In order to hold a plurality of cards in accurate registration for grooving, an aligning pin 126 is adjustably mounted on carriage 14 to extend upwardly normal to the plane of the carriage. The aligning pin 126 is arranged to extend through any of a plurality of coding apertures 132 formed along edge portions of the cards 12, as best illustrated in Fig. 1 of the drawings. The pin holds the cards in registering relation and prevents relative displacement by the cutter during the grooving operation. When the pin 126 extends through an aperture on one side of the stack of cards, as indicated in Fig. 1, the stack can be turned to present either of three sides to the cutting element. For example, the cards may be held as indicated in Fig. 1 for grooving the cards at one end. Without disturbing the registration, and the engagement of the stack by the pin, the stack may be moved bodily about the aligning pin 126 as a pivot, to present a longitudinal side to the cutter, or to present the opposite end to the cutter. The stack must be removed and the cards replaced with the pin extending through an aperture upon another side of the card before the edge originally applied over pin 126 can be moved to notching position.

A stack of cards placed upon the aligning pin 126 is moved to place the edge of the stack where a groove is to be cut against the facing plate 7 of the cover housing. The carriage 14 is then shifted bodily to the right or left as required to position the stack so that the cutter 4 can be operated to groove the edges of the cards to a selected coding aperture.

The edge of the stack of cards 12 in which the coding groove is to be cut, is solidly supported upon a bar 166 which extends across the width of the base housing 1 with its upper surface in the plane defined by the cover plate 130. The front shield plate 7 is secured to the bar at right angles to the plane of the upper surface of the bar and cover plate 130, so that the stack may be held firmly in cutting position. The initial downward movement of the hand lever 41 causes the cutter 4 to be moved downwardly from its normal elevated position shown in full lines in Figs. 7 and 8 of the drawings into engagement with the top of the stack of cards.

In order to insure a clean cut through the lowermost card of the stack of cards 12, the machine is provided with a cutter block 190 made of wood or other suitable material onto which the cutting edge may be pressed without damage to the cutting edge. While it would be possible on a stationary block of hard wood or similar material positioned in line with the cutting element 4, such a block would be short lived as repeated engagement by the cutting knife 4 onto the same area of the block would soon scar the block in such a way as to prevent a clean cut through the lowermost card 12.

To minimize the scoring action of the cutter 4, and to provide a cutter block which will stand up under hard usage, the present machine is provided with a rotatable cutter block of cylindrical form rotated and shifted axially with respect to the cutter between successive operations of the cutter.

Figure 2:
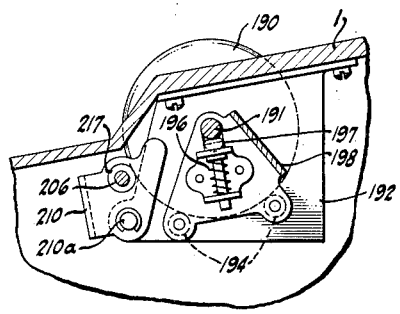
Fig. 2 is a fragmental detail view, partly in section, illustrating parts of the cutter block control mechanism.
Figure 3:
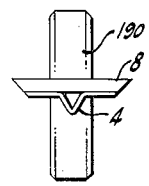
Fig. 3 is a fragmentary plan view illustrating the relationship between the cutter and the cutter block.

As illustrated, the cutter block 190 is a cylindrical body of wood, plastic, or other suitable material, mounted for free rotation upon a shaft 191 extending across a mounting bracket 192 secured on the under side of the main base housing 1. The shaft 191 is yieldably supported within elongated bearing openings 193 formed in opposite sides of the bracket 192. The bearing openings permit a limited vertical movement of the shaft 191 and cutter block 190 upon the bracket 192 whereby the cutter block 190 may be moved to engage and disengage a pair of stop rods 194 extending transversely across the bracket 192 below the cutting block 190. As seen in Fig. 3, the cutter block 190 is relatively wide with respect to the width of the cutter blade 4. The shaft 191 is normally held in its raised position in engagement with the tops of the elongated bearing openings 193 by a spring 196 exerting an upward pressure against a block 198 slidably mounted in a bracket 198 positioned upon one side of the bracket 192 and bearing against the lower surface of the shaft 191 in the manner shown in Fig. 2.

Figure 8:
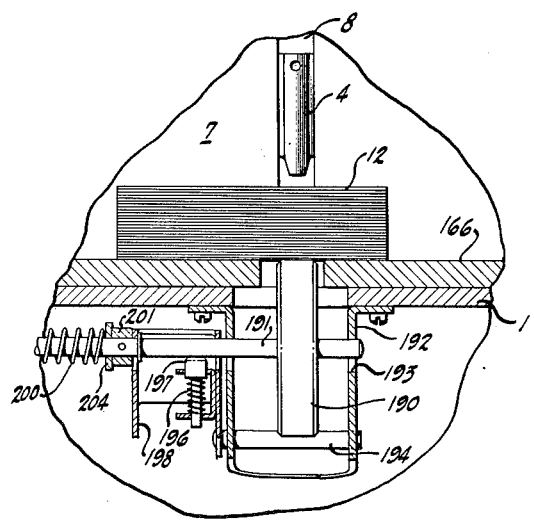
Fig. 8 is a fragmental sectional view illustrating the relation of the cutter, cards and cutter block, the plane of the section being indicated by the line 8—8 of Fig. 7.

The rods 194 are slidably movable relative to the bracket 192, and are secured at one end to the bracket 198 for axial movement thereby. The shaft 191 extends through the bracket 198 and the adjacent side wall of the base housing 1; and is provided with a knob 199 upon the outer end thereof by which the shaft may be moved axially to disengage the cutter block 190. A compression spring 200 is mounted over the shaft 191, between the housing 1 and a collar 201 secured to the shaft, to normally urge the shaft toward its operative position. The end portion of the bracket 198 adjacent the bracket 192 has an elongated opening matching and registering with the bearing openings 193 of the bracket 192 as depicted in Fig. 8 to permit relative vertical movement of the shaft; and the other end of the bracket 198 is similarly slotted and is engaged between the collar 201 and retainer 202 for moving the bracket with the shaft.

Axial movement of the shaft 191 to disengage the cutter block 190 causes the rods 194 to be moved from under the block, permitting the block to be removed for refinishing or replacement as required. A stop 203, having a finger 204 extending longitudinally from the hub toward the housing wall 1, limits movement of the shaft 191 to permit removal of cutting block 190 without moving the shaft 191 entirely out of engagement with bracket 192.

The block 190 is rotated upon the shaft 191 by means of a roller 205 secured to a shaft 206 extending transversely across the mounting bracket 192 in a position such as to maintain a light driving contact with the periphery of the cylindrical cutting block 190. The shaft 206 is driven by means of a belt 207, preferably of coil spring construction, operating over a pulley 208 secured to the shaft 206, and a pulley 209 secured to the motor driven shaft 27.

Figure 7:
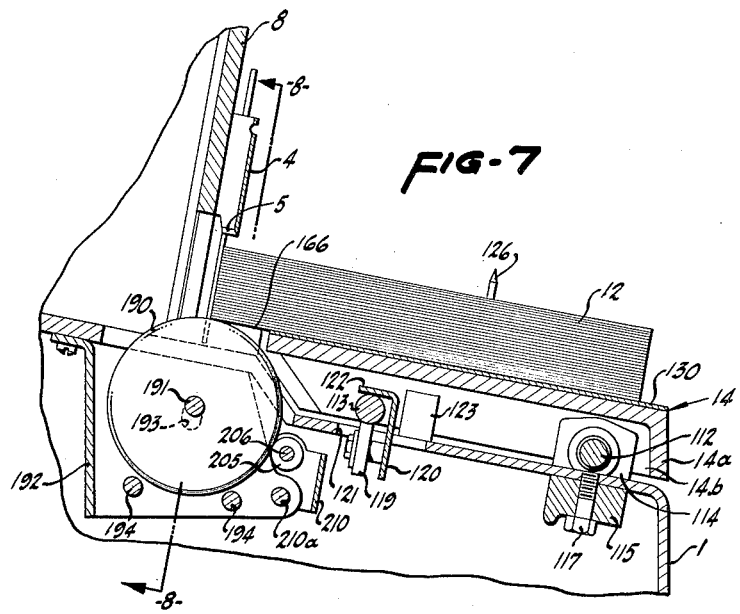
Fig. 7 is a fragmental sectional view in elevation, illustrating the manner in which a stack of cards is held between the cutting blade and the cutting block for grooving.

The shaft 206 is axially movable through journals 211 in the arms of a bail 210, as shown partially by broken lines in Fig. 7, pivotally mounted upon the bracket 192 by means of a pivot shaft 210a, also shown in Fig. 7. A drive hub 212 of rubber or other suitable material is secured upon the end of the shaft 206 opposite the drive pulley 208. The drive hub 212 abuts against a cam 213 mounted upon an eccentrically positioned mounting pin 214 carried by a mounting bracket 215. The cam 213 is provided with a knurled or toothed edge engaging the end of the drive hub 212 at a point offset from the axis of the hub 212 and the shaft 206, as best illustrated in Fig. 6 of the drawings. The hub 212 is held in driving engagement with the cam 213 by means of a compressed spring 216 mounted between the hub 212 and a thrust bearing 217 carried by the shaft 206. The cam 213 is freely rotatable upon the bracket 215. As the cam is driven by contact with the end of the hub 212, its eccentricity causes the hub, and the shaft 206 upon which it is mounted, to be shifted axially with a reciprocating movement through a range equal to the throw of the cam 213. The length and flexibility of the belt or cable 207 permits the shaft 206 to be shifted without disturbing the driving connection to the shaft through the belt, as best indicated in Fig. 5 of the drawings.

As the shaft 206 is shifted axially by engagement with the cam 213 it imparts a corresponding transverse movement to the cutter roller 190 along its shaft 191 so that rotation of the shaft 206 imparts rotation to the cam 213 which in turn imparts axial movement to the shaft 206 and the drive roller 205 secured thereto. This movement of the drive roller 205 imparts rotation to the cutting block 190 and also causes the block to be shifted axially along the shaft 191 with the drive roller 205, so that at each operation of the cutter 4, a different area of the cutting block 190 will be exposed to the cutting action of the blade as it cuts through the lowermost card 12 of the stack. As the cutter 4 is pressed downwardly against the stack of cards, during its cutting stroke, the cutting block 190 is pressed downwardly to seat against the stop rods 194, thereby holding the cutting block against rotation during the cutting action. The coil spring cable 207 slips over one or the other of the drive pulleys or the drive roller 205 slips on the cutting block 190 during the period the cutting block 190 is held against rotation.

The cutter 4 and the actuating and control mechanism therefore is substantially entirely enclosed within the main frame housing 1 and cover 3, only the V-shaped rib of the cutting element 4 being exposed through the slot in the front shield plate 7. A cowl 218 projects forwardly from the cover housing 3 to overhang the cutter blade 4 and additionally shield the cutter from engagement by external objects or by the hands of a workman.

In operation, a stack of cards 12 is placed upon the carriage 14 with the aligning pin 126 extending upwardly through aligned apertures 132 on one side of the stack of cards other than the side to be grooved. With the cards so held in accurately registering relation, the stack is moved bodily to abut the front closure plate 7 with the edge to be grooved supported on the crossbar 166. The carriage 14 is then moved to right or left as required to position the stack with a desired aperture 132 aligned with the cutting element 4. With the cards thus positioned, the hand lever 41 is pressed downwardly to set the power driven mechanism into operation.

The cutter 4 is moved to rest against the top of the stack, and is forced downwardly through the stack of cards to cut a groove in the edge of the stack opening into a selected coding aperture 132 of the card.

As the cutting stroke is completed, the hand lever 41 is released for return to its starting position, and the cutter 4 is returned to its original position.

The stack of cards is then shifted to move the next coding aperture, to which a groove is to be cut, into alignment with the cutter 4. If the next point is on the same side of the card, the carriage is moved to right or left as required. If the point to be grooved is on another edge of the card, the stack is moved bodily about the aligning pin 126, to present a desired edge to the cutter, or the stack may be removed bodily from the aligning pin 126 and replaced with the aligning pin extending through a different aperture or another edge of the stack of cards. The operation is, of course, repeated as many times as necessary to effect a desired coding of the cards in accordance with a general classification common to large groups of cards. In the embodiment illustrated, as many as 150 cards can be readily grooved at selected points along selected edges at one time. The movement of the carriage 14, and the aligning pin 126 facilitates the placing and holding of cards in accurate registration, and insures an accurate positioning of the cards for each grooving operation.

Having thus described my invention, what I claim and desire by Letters Patent is:

1. A machine for grooving record cards for classification comprising a relatively narrow cutter, means for supporting a record card with an edge portion thereof aligned with the cutter for grooving at a predetermined point thereon, a relatively wide cutter block mounted in alignment with the cutter for engagement thereby, and means for axially reciprocating the cutter block normal to the path of movement of said cutter to present different areas of the block to the cutter at successive operations.

2. A machine for grooving record cards for classification comprising a relatively narrow cutter, means for supporting record cards with edge portions thereof aligned with the cutter for grooving thereby, a relatively wide cutter block rotatably mounted in alignment with the cutter about an axis normal to the path of movement of said cutter and providing an abutment against which the cutter is moved for cutting through the cards, and means for shifting the block axially between cutting operations.

3. A machine for grooving record cards for classification comprising a relatively narrow cutter, means for supporting record cards with edges thereof presented to the cutter for grooving, a relatively wide cutter block movably mounted in alignment with the cutter and providing an abutment against which the cards may be held for grooving, means for rotating the block, means for shifting the block along a line normal to the path of movement of said cutter during its rotation, and means for holding the block stationary during cutting movement of the cutter.

4. A machine for grooving record cards for classification comprising a relatively narrow cutter, means for supporting record cards with edges thereof presented to the cutter for grooving, a shaft, a relatively wide cutter block rotatably mounted for rotation about an axis normal to the path of movement of the cutter near the shaft in alignment with the cutter and providing an abutment against which the cards may be pressed by the cutter for grooving, a drive roll upon the shaft frictionally engaging the cutter block for imparting movement thereto, means for rotating the shaft, an eccentric adjacent an end of the shaft, and means carried by the shaft and engaging the eccentric for imparting axial movement to the shaft and the cutting block.

5. A cutter block for machines having a relatively narrow reciprocating cutter comprising a shaft mounted normal to the path of the cutter, a relatively wide cylindrical block mounted upon the shaft in alignment with the cutter, means for rotating the block between cutting strokes of the cutter, and means for reciprocating the block axially of the shaft during its rotation thereon.

6. A cutter block for machines having a relatively narrow reciprocating cutter comprising a block supporting shaft mounted normal to the path of the cutter, a relatively wide cylindrical cutter block rotatable upon the shaft, a drive shaft parallel to the supporting shaft, means for rotating the drive shaft, a drive roller secured to the drive shaft and frictionally engaging the cutter block for imparting movement thereto, a rotatable cam, and a hub upon the drive shaft engaging the cam for moving the drive roller axially to impart reciprocating movement to the cutter block during its rotation.

7. A cutter block for machines having a relatively narrow reciprocating cutter comprising a yieldably mounted block supporting shaft positioned normal to the path of the cutter, a relatively wide cylindrical cutter block rotatable upon the shaft, stop means for limiting yielding movement of the cutter block and its supporting shaft under pressure applied thereto by the cutter and for holding the block against rotation as the cutter is moved along its cutting stroke, a drive shaft parallel to the supporting shaft, a drive roller secured to the drive shaft and frictionally engaging the cutter block for imparting movement thereto, and means for rotating the drive shaft.

8. A cutter block for machines having a relatively narrow reciprocating cutter comprising a yieldably mounted block supporting shaft positioned normal to the path of the cutter, a relatively wide cylindrical cutter block rotatably and axially movably supported upon the shaft, stop means for limiting yielding movement of the cutter block and its supporting shaft under pressure applied thereto by the cutter and for holding the block against rotation as the cutter is moved along its cutting stroke, a drive shaft parallel to the supporting shaft, a drive roller secured to the drive shaft and frictionally engaging the cutter block for imparting movement thereto, means for reciprocating the drive shaft and roller during rotation thereof, and means for rotating the drive shaft.

9. A cutter block for machines having a relatively narrow reciprocating cutter comprising a yieldably mounted block supporting shaft positioned normal to the path of the cutter, a relatively wide cylindrical cutter block rotatably and axially movably supported upon the shaft, stop means for limiting yielding movement of the cutter block and its supporting shaft under pressure applied thereto by the cutter and for holding the block against rotation as the cutter is moved along its cutting stroke, a drive shaft parallel to the supporting shaft, a drive roller secured to the drive shaft and frictionally engaging the cutter block for imparting movement thereto, a cam rotatably mounted adjacent an end of the drive shaft upon an axis at right angles to the axis of said drive shaft for rotation in a plane parallel to and spaced from the axis of the drive shaft, a hub upon the drive shaft engaging the cam for rotating the cam and to impart reciprocating movement to the drive shaft and drive roller, and means for rotating the drive shaft.

10. A cutter block for machines having a relatively narrow reciprocating cutter comprising a supporting shaft rotatably mounted below the cutter with its axis normal thereto and transversely movable to and from an operative position, a relatively wide cylindrical cutter block rotatable upon the shaft in alignment with the cutter, spring means normally urging the shaft toward its operative position and yieldable to permit transverse movement of the shaft when the cutter strikes the block, and means for axially moving the block to present a different area to the cutter at each operation thereof.

11. A cutter block for machines having a relatively narrow reciprocating cutter comprising a block supporting shaft positioned with its axis normal to the path of the cutter and having limited transverse movement along the path of the cutter, spring means normally urging the shaft to its limit of movement toward the cutter, a relatively wide cylindrical block rotatably mounted upon the shaft in line with the cutter, stop means adjacent the block and providing a seat for engaging the block and preventing rotation thereof when the block is subjected to pressure by movement of the cutter along its cutting stroke, and means for moving the block axially relative to the supporting shaft to present a different area to the cutter at each operation thereof.

References Cited in the file of this patent

UNITED STATES PATENTS

| | | |
|---|---|---|
| 1,236,508 | Wadhams | Aug. 14, 1917 |
| 1,676,260 | Glidden | July 10, 1928 |
| 2,043,684 | Walter | June 9, 1936 |
| 2,405,598 | Miller | Aug. 13, 1946 |
| 2,576,211 | Bone | Nov. 27, 1951 |
| 2,690,219 | Feiertag | Sept. 28, 1954 |

FOREIGN PATENTS

| | | |
|---|---|---|
| 301,937 | Germany | Nov. 14, 1917 |